United States Patent [19]

Kluver et al.

[11] Patent Number: 5,568,716
[45] Date of Patent: Oct. 29, 1996

[54] ROUND BALE WRAPPING

[75] Inventors: Leroy Kluver, Celina; Donald E. Line, Coldwater, both of Ohio

[73] Assignee: AGCO Corporation, Duluth, Ga.

[21] Appl. No.: 425,348

[22] Filed: Apr. 19, 1995

Related U.S. Application Data

[63] Continuation of Ser. No. 53,914, Apr. 27, 1993, Pat. No. 5,433,059.

[51] Int. Cl.$^6$ ............................. B65B 13/04; B65B 63/04
[52] U.S. Cl. ................................. 53/399; 53/430; 53/587; 53/508
[58] Field of Search .................................. 53/118, 389.3, 53/399, 430, 587, 508

[56] References Cited

U.S. PATENT DOCUMENTS

| | | |
|---|---|---|
| 3,910,178 | 11/1975 | Eggers et al. . |
| 4,296,595 | 10/1981 | Meiners . |
| 4,319,446 | 3/1982 | Arnold et al. . |
| 4,366,665 | 1/1983 | VanGinhoven et al. . |
| 4,389,929 | 6/1983 | Kluver et al . |
| 4,389,930 | 6/1983 | Rutschilling . |
| 4,407,113 | 10/1983 | Core . |
| 4,409,784 | 10/1983 | VanGinhoven et al. . |
| 4,563,854 | 1/1986 | Ackerman et al. ........................ 53/118 |
| 4,569,439 | 2/1986 | Freye et al. . |
| 4,580,398 | 4/1986 | Bruer et al. . |
| 4,597,241 | 7/1986 | Clostermeyer . |
| 4,604,855 | 8/1986 | Krone et al. . |
| 4,676,046 | 6/1987 | Verhulst et al. . |
| 4,677,807 | 7/1987 | Verhulst et al. . |
| 4,691,503 | 9/1987 | Frerich . |
| 4,697,402 | 10/1987 | Anstey et al. . |
| 4,729,213 | 3/1988 | Raes . |
| 4,768,431 | 9/1988 | Merritt, III et al. . |
| 4,779,526 | 10/1988 | Frerich et al. . |
| 4,787,193 | 11/1988 | Verhulst et al. ........................... 53/118 |
| 4,802,395 | 2/1989 | Merritt, III et al. . |
| 4,813,348 | 3/1989 | Frerich et al. . |
| 4,896,477 | 1/1990 | Wagstaff et al. ........................... 53/118 |
| 4,917,008 | 4/1990 | van den Wildenberg . |
| 4,924,405 | 5/1990 | Strosser et al. . |
| 4,941,311 | 7/1990 | Ardueser et al. . |
| 4,956,959 | 9/1990 | Rumph et al. . |
| 4,956,960 | 9/1990 | Anstey et al. . |
| 4,969,315 | 11/1990 | Ardueser et al. . |
| 4,995,216 | 2/1991 | Vansteelant . |
| 5,036,642 | 8/1991 | Underhill . |
| 5,079,898 | 1/1992 | Springs et al. . |
| 5,090,182 | 2/1992 | Bethge . |
| 5,109,652 | 5/1992 | Viaud et al. ............................. 53/508 |
| 5,129,207 | 7/1992 | Butler . |
| 5,152,123 | 10/1992 | Viaud et al. . |
| 5,181,368 | 1/1993 | Anstey et al. . |
| 5,216,873 | 6/1993 | Ratslaff et al. ........................... 53/587 |
| 5,231,828 | 8/1993 | Swearingen et al. . |

OTHER PUBLICATIONS

NI New Idea Round Balers brochure.
NI New Idea Round Balers brochure.
Vicon pulled out all the steps in round baling Introducing the new continuous RP 1211C round balers. With Elasti–Wrap. Only from Vicon. brochure.
Simpler Easier Better Baler! The Complete System Krone Niemeyer brochure.
M&W Round Baling System The Round Baler that won't let hay quality slip through the belts.

*Primary Examiner*—Linda Johnson
*Attorney, Agent, or Firm*—Lockwood, Alex, Fitzgibbon & Cummings

[57] ABSTRACT

An apparatus and method are provided for wrapping roll material around a round bale within a bale forming chamber of a round baler including a drive belt tensioner idler, a wrapping material brake and a wrapping material cut-off knife all disposed on a carriage that is articulated between a wrapping material feeding position and a cut-off/stop position. When baling is completed, a signal is provided for movement to the feeding position at which time the wrapping material is held taught to maintain bale compression. After sensor data are fed back to a controller to signal feeding has proceeded for the desired length of time and/or to deploy the desired length of wrapping material, the device articulates to the cut-off position to sever the wrapping material to allow completion of the bale wrapping procedure. A crop recycling mechanism can also be provided to re-feed stray crop material into the baling chamber.

29 Claims, 11 Drawing Sheets

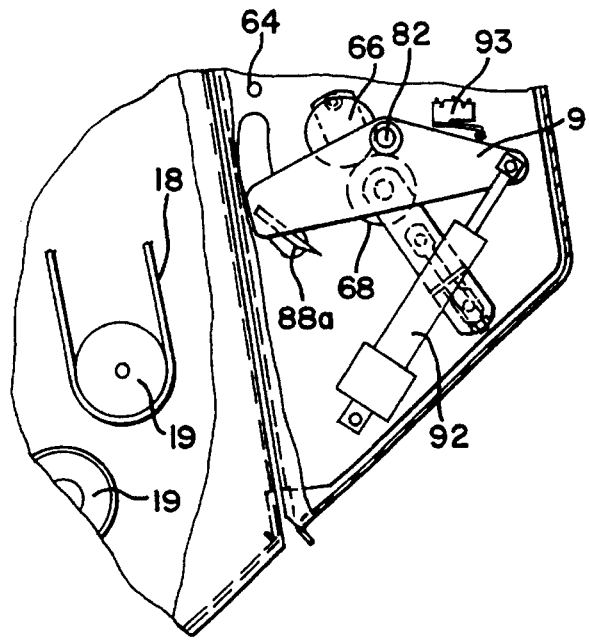
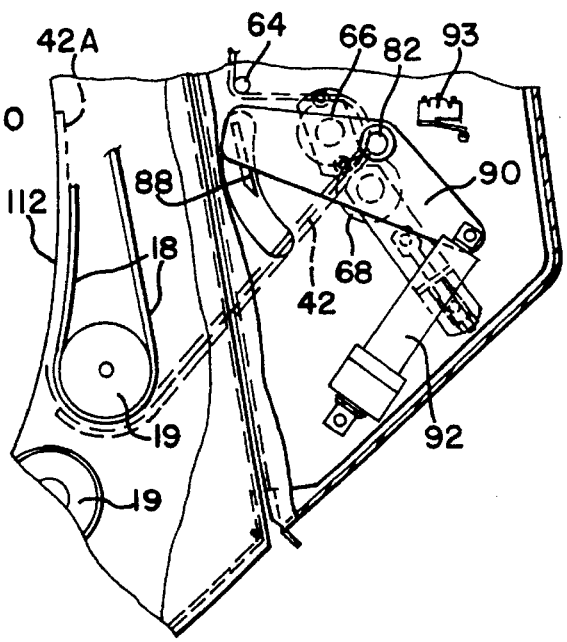
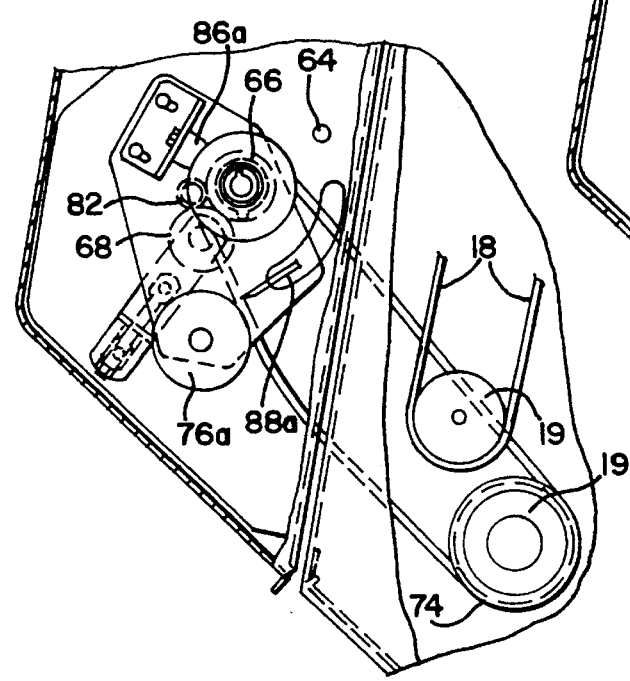
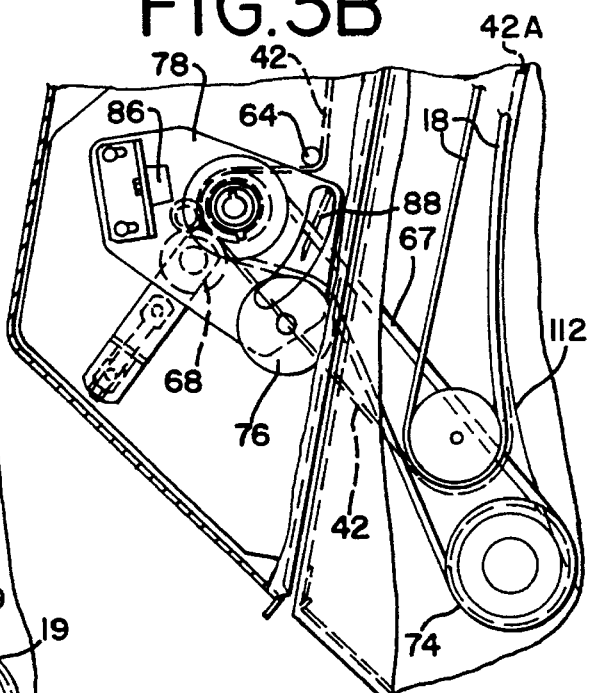

ROUND BALE WRAPPING

This application is a continuation of application Ser. No. 053,914, filed Apr. 27, 1993 now U.S. Pat. No. 5,433,059.

FIELD OF THE INVENTION

The present invention is directed to a bale wrapping apparatus and method for wrapping round bales with netting or the like. More particularly, the present invention is directed to a bale wrapping apparatus having a wrapping material feed drive, a feed roll brake and a wrapping material cut-off mechanism all disposed on a single carriage articulated between a bale wrap feeding position and a bale wrap stop/cutting position. The invention is especially suitable for use in fixed chamber round balers, and it also encompasses other features useful in reducing crop loss and in controlling feed and wrapping, as well as balers and methods incorporating such features.

BACKGROUND OF THE INVENTION

For many years agricultural practices have included baling of forage crops such as hay and alfalfa with the objective of preserving these crops to feed livestock when needed, such as during the winter or other non-growing season or when adequate grazing resources are not otherwise available. One common method of preserving forage crops is to form the forage crop into bales which can be easily stored. Included are bales which are typically rectangularly shaped and sized such that an individual can stack and move these hay bales a short distance to a barn or other storage area. Also included are round bales which can be better suited than rectangular bales for specific needs of agriculture and livestock feeding.

Round baling has gained wide acceptance in many facets of agriculture and livestock handling for gathering and storing forage crops. Round balers are generally pulled by a tractor through a field of cut forage crop, such as hay or alfalfa, which is then introduced into the round baler through a passageway or throat into a cylindrical chamber. Belts or rollers are utilized within the chamber to form and tumble the forage material into a large cylindrical, or "round," bale of forage crop. Typically, the round bale provides a more densely packed outer shell that acts as a shield, while a more loosely packed inner portion allows for drying of the crop. In addition, it is well known to tie or wrap the bale in the field with twine or netting to preserve the densely packed outer shell and to maintain the bale in its cylindrical shape. Because these bales usually are quite large, often approaching six feet in diameter and 2,000 pounds in weight, systems have been developed for automatically wrapping the bale with twine or netting while the bale rotates within the baler. Automatic mechanisms have evolved which are intended to minimize the time and effort necessary to wrap a bale.

Automatic twine tying machines use rolls of twine fed into the baling chamber by various cooperating feed arms that deploy the twine in a desired wrapping pattern. Other automatic wrapping mechanisms wrap the bale with polymeric sheeting or netting fed into the baler from a large roll of sheeting or netting that is unwound, fed into the baling chamber and wrapped around the bale as the formed bale is rotated within the baler. Some roll wrapping systems are less than fully desirable because of their expense or somewhat complicated mechanisms, some of which are not particularly well suited to use on fixed chamber round balers. Previous roll wrapping mechanisms can be difficult to adjust for achieving desired performance characteristics, can present safety concerns, and can experience undesirable roll wrapping and problematic net tensioning.

SUMMARY OF THE INVENTION

The bale wrapping of the present invention overcomes the problems of the prior art and provides unique bale wrapping especially suitable for use in fixed chamber round balers that utilize a plurality of forming belts and drive rollers disposed about the fixed chamber for forming and rotating forage crop into a cylindrical bale. The bale wrapping apparatus has a bale wrap cut-off knife, a belt idler and a bale wrap brake, all of which move together, typically by being disposed on the same rotatable carriage. An actuator cooperates with the carriage and is adapted to reciprocate the carriage between a bale wrap feeding position whereby bale wrap is introduced into the baling chamber and a bale wrap cutting position at which the bale wrap brake maintains a portion of the supply of bale wrap in tension, which facilitates severance of the bale wrap by the cut-off knife for completion of the wrapping operation. A bale wrap roll support and a bale feed sensor for monitoring use of a supply of bale wrap preferably are also provided.

It is therefore a general object of the present invention to provide an improved bale wrapping apparatus for wrapping bale netting and the like around round bales within the baler.

It is a further object of the present invention to provide a bale wrapping apparatus having a bale wrap cut-off knife, belt idler and a bale wrap brake disposed on a carriage having a single center of rotation.

A further object of the present invention is to provide a recycling mechanism for use in a round baler to reintroduce loosened forage material back into the bale chamber during bale formation, thereby reducing crop or leaf loss especially when baling dry alfalfa or the like.

Yet another object of the present invention is to provide a bale wrapping apparatus having a bale wrap feed arrangement for guiding the bale wrap into the bale wrap feed roll pinch point to enhance safety and help prevent wrapping around rolls of the apparatus.

Another object of this invention is to provide a cost-effective, reliable assembly which can function for introducing bale wrap material into a bale wrap pinch point, which assembly shifts to allow it to pass corn stover, corn cobs, other crop materials, or foreign objects without causing plugging.

BRIEF DESCRIPTION OF THE DRAWINGS

For a more complete understanding of the present invention reference should now be made to the embodiments illustrated in greater detail in the accompanying drawings and described below by way of example of the invention. It should be understood that the invention is not necessarily limited to the particular embodiments illustrated herein but is defined by the appended claims.

IN THE DRAWINGS

Figure 1:
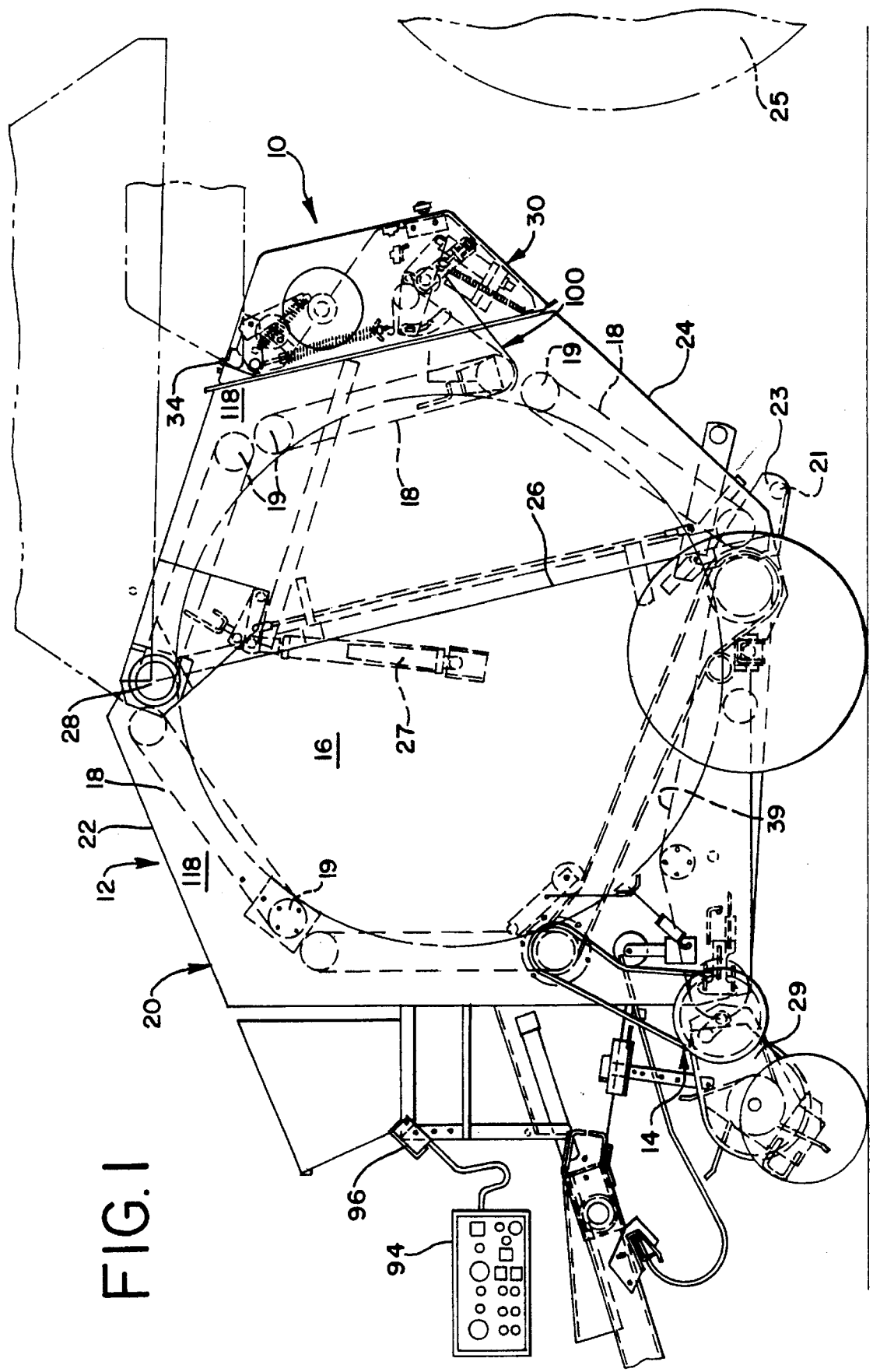
Figure 2:
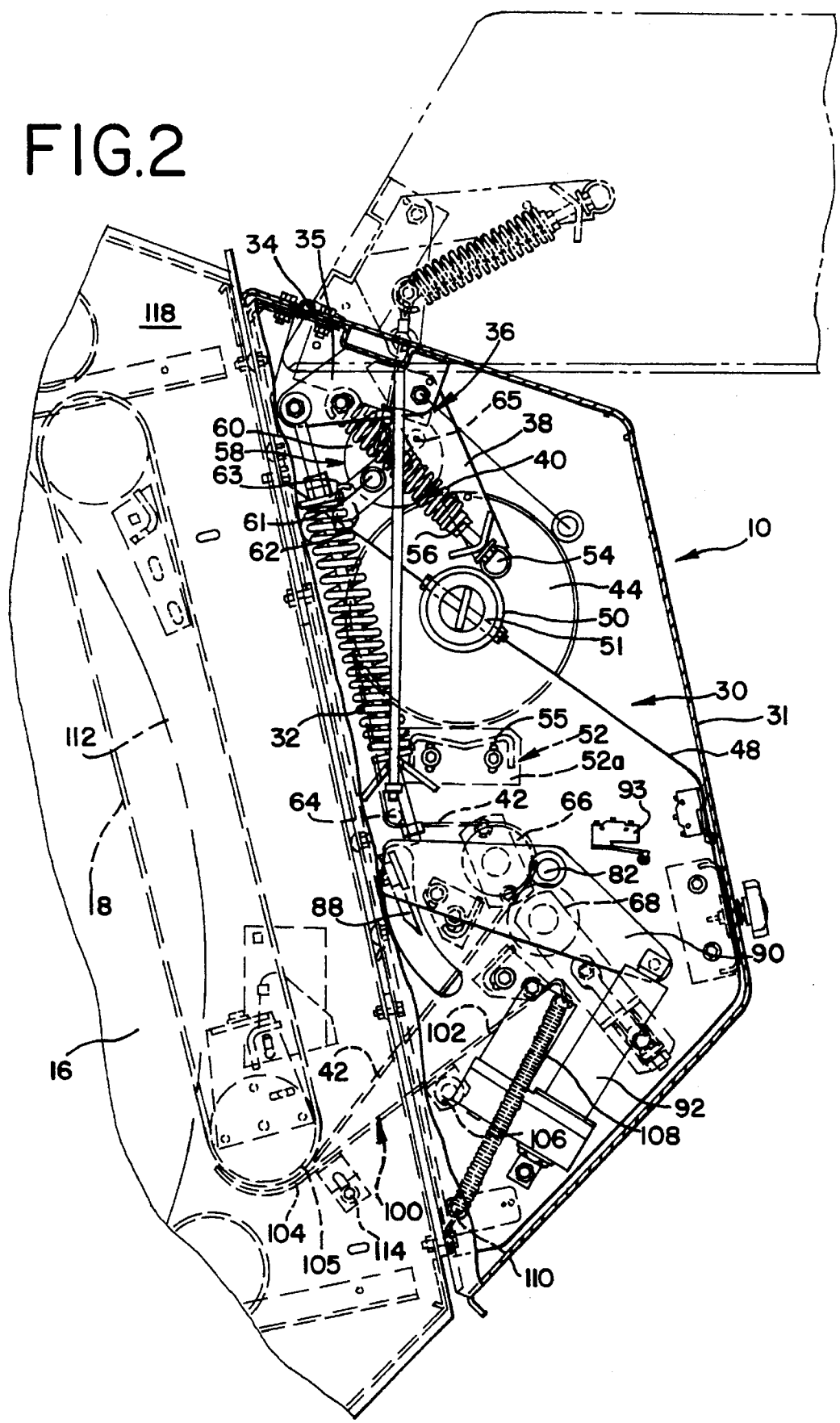
Figure 3:
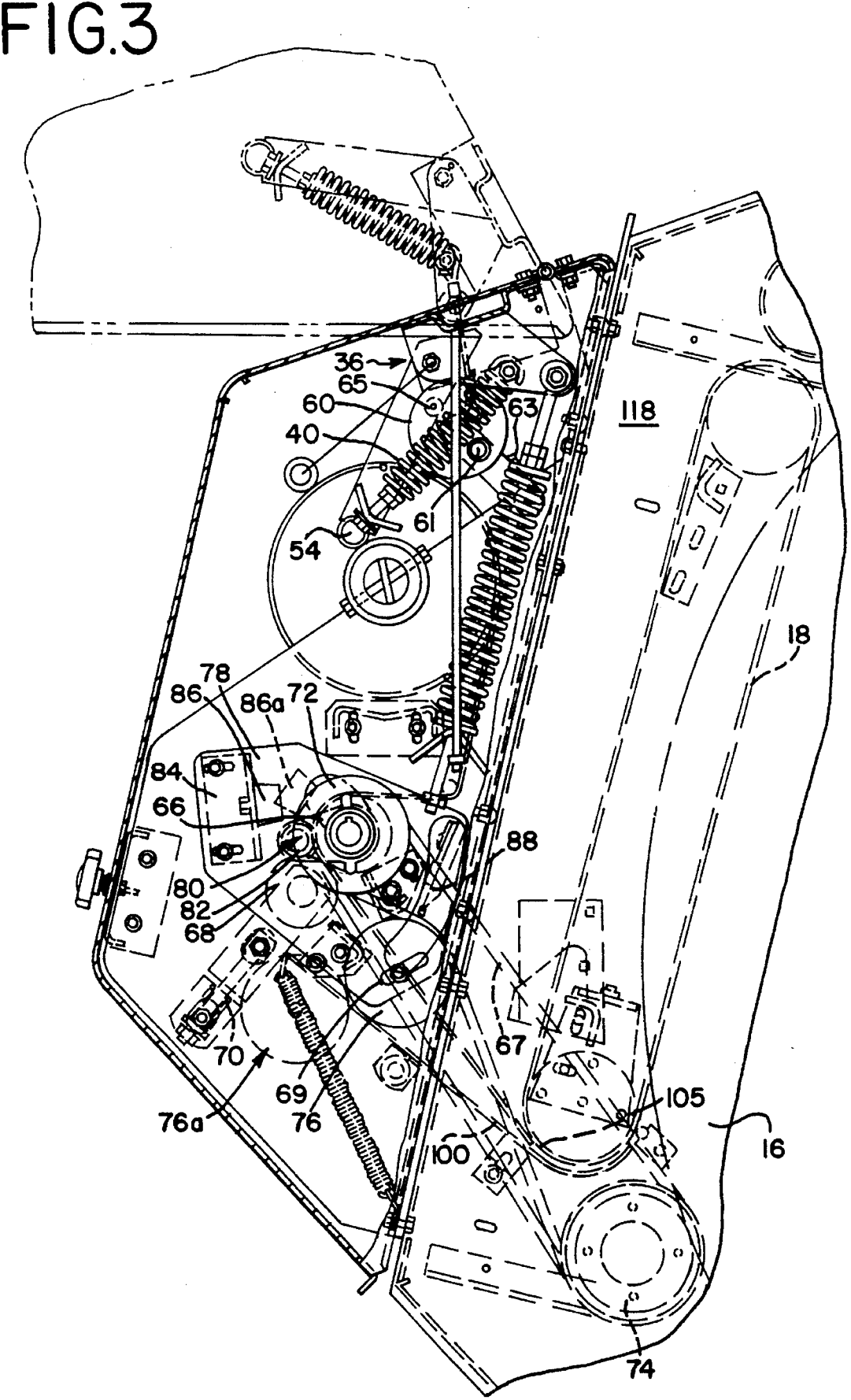
Figure 4:
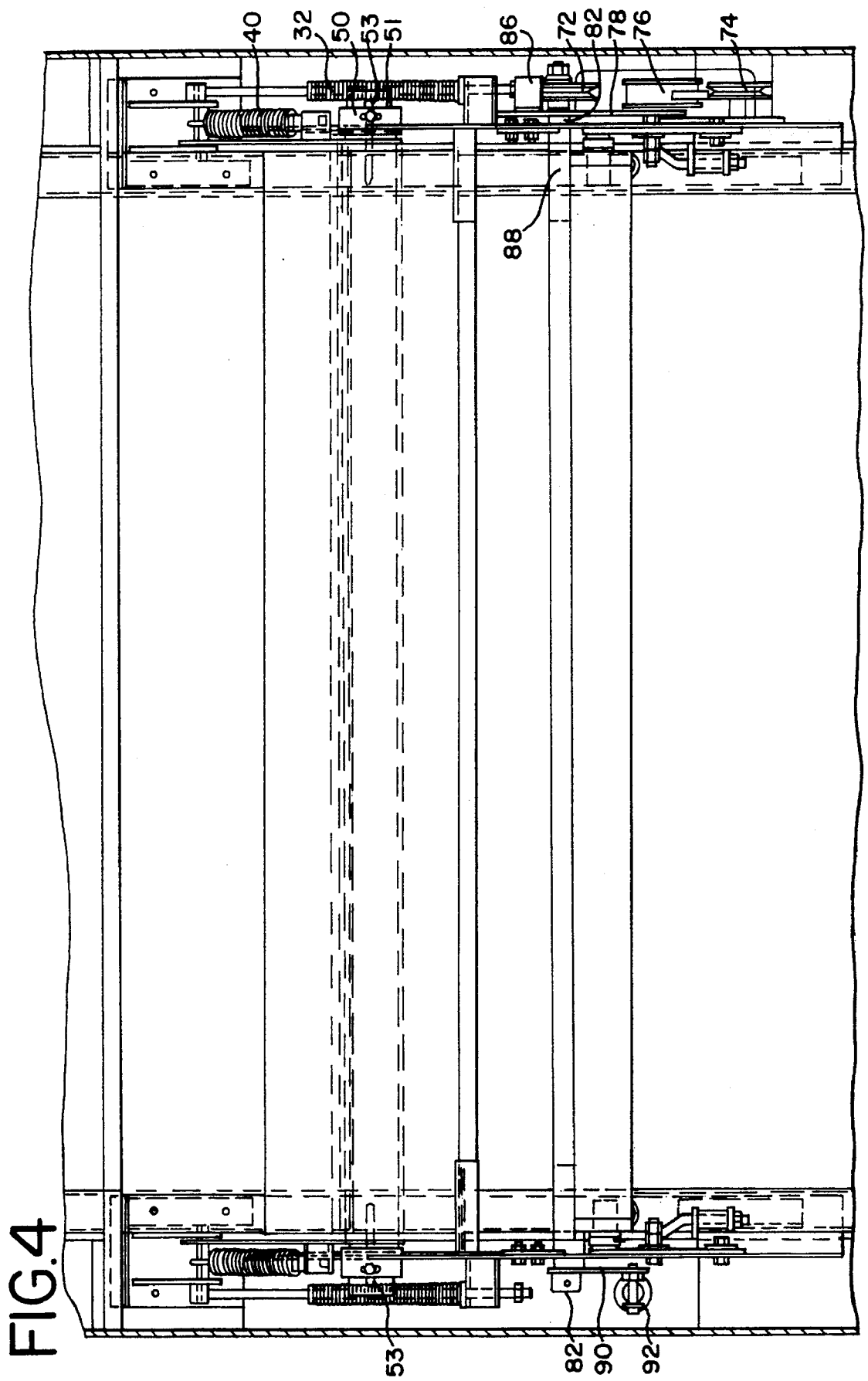
Figure 5:
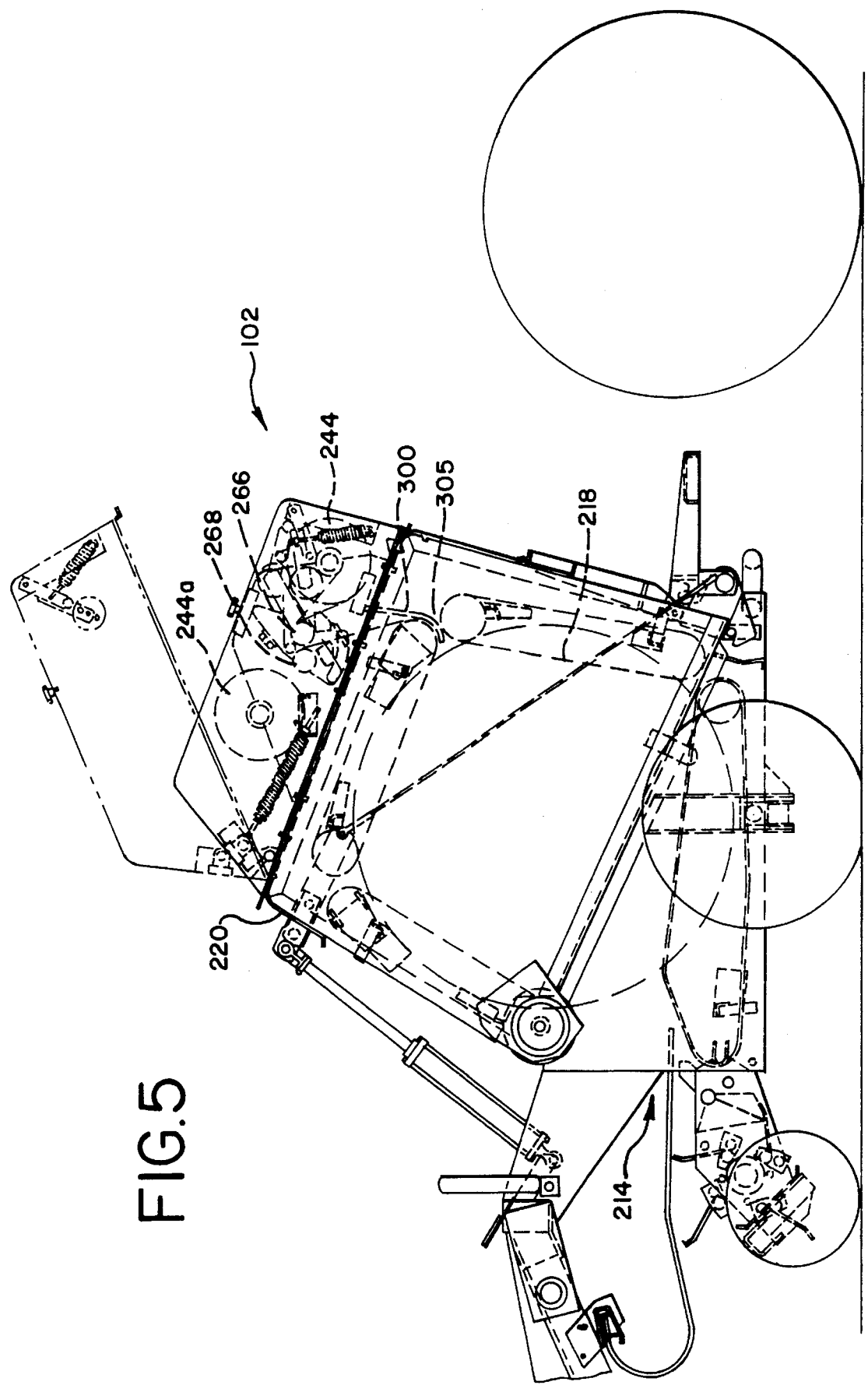
Figure 5A:
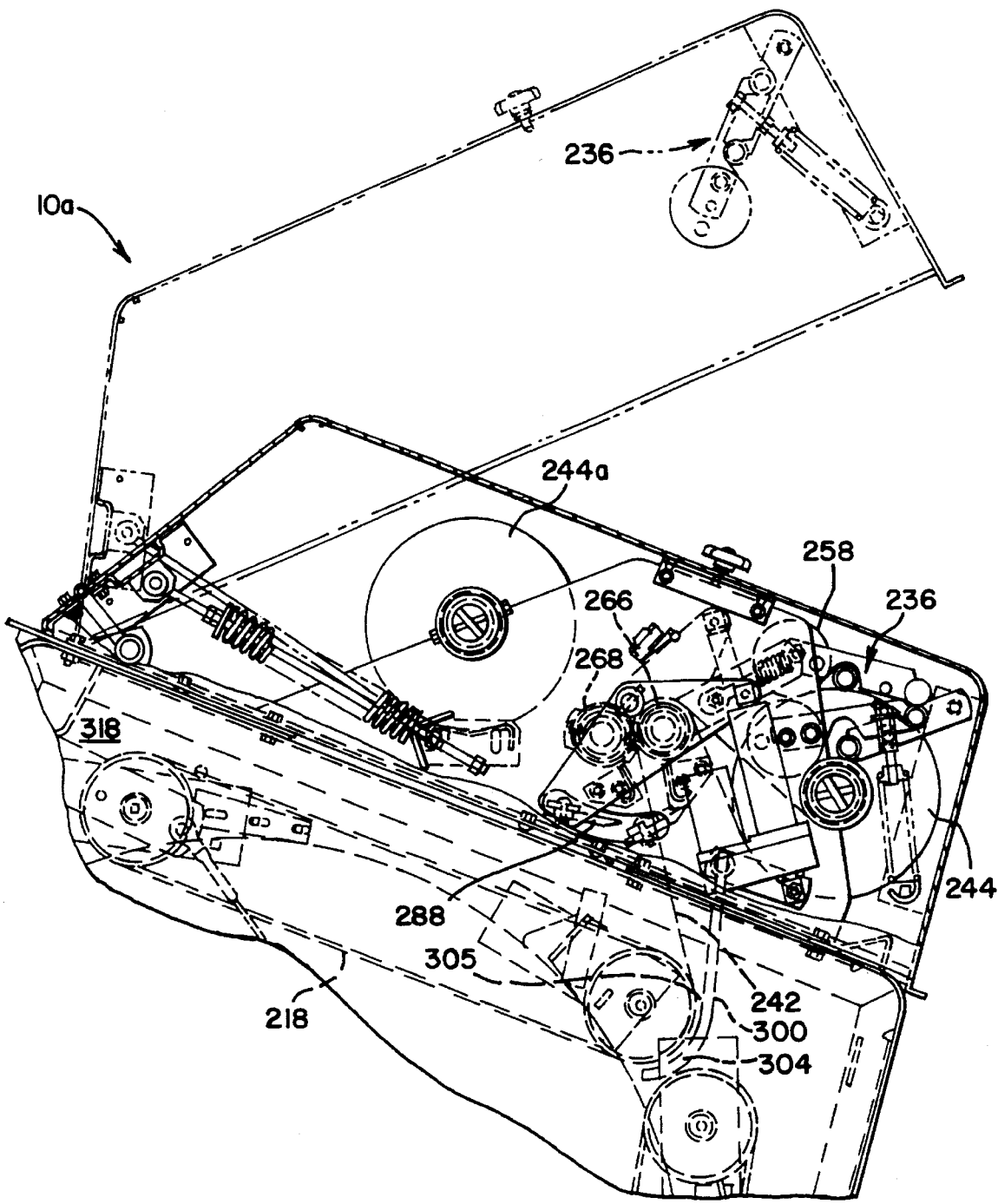
Figure 5B:
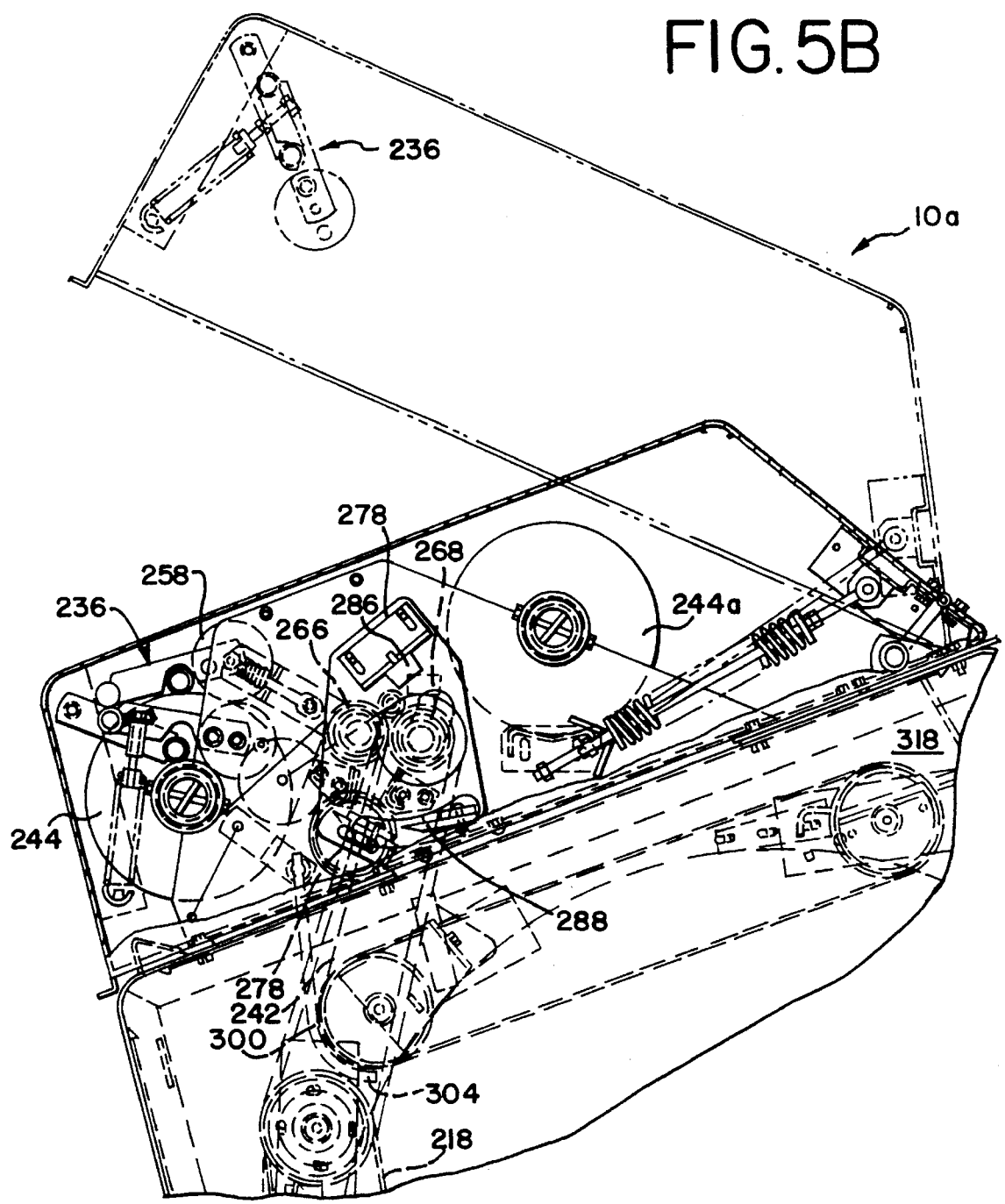
Figure 6:
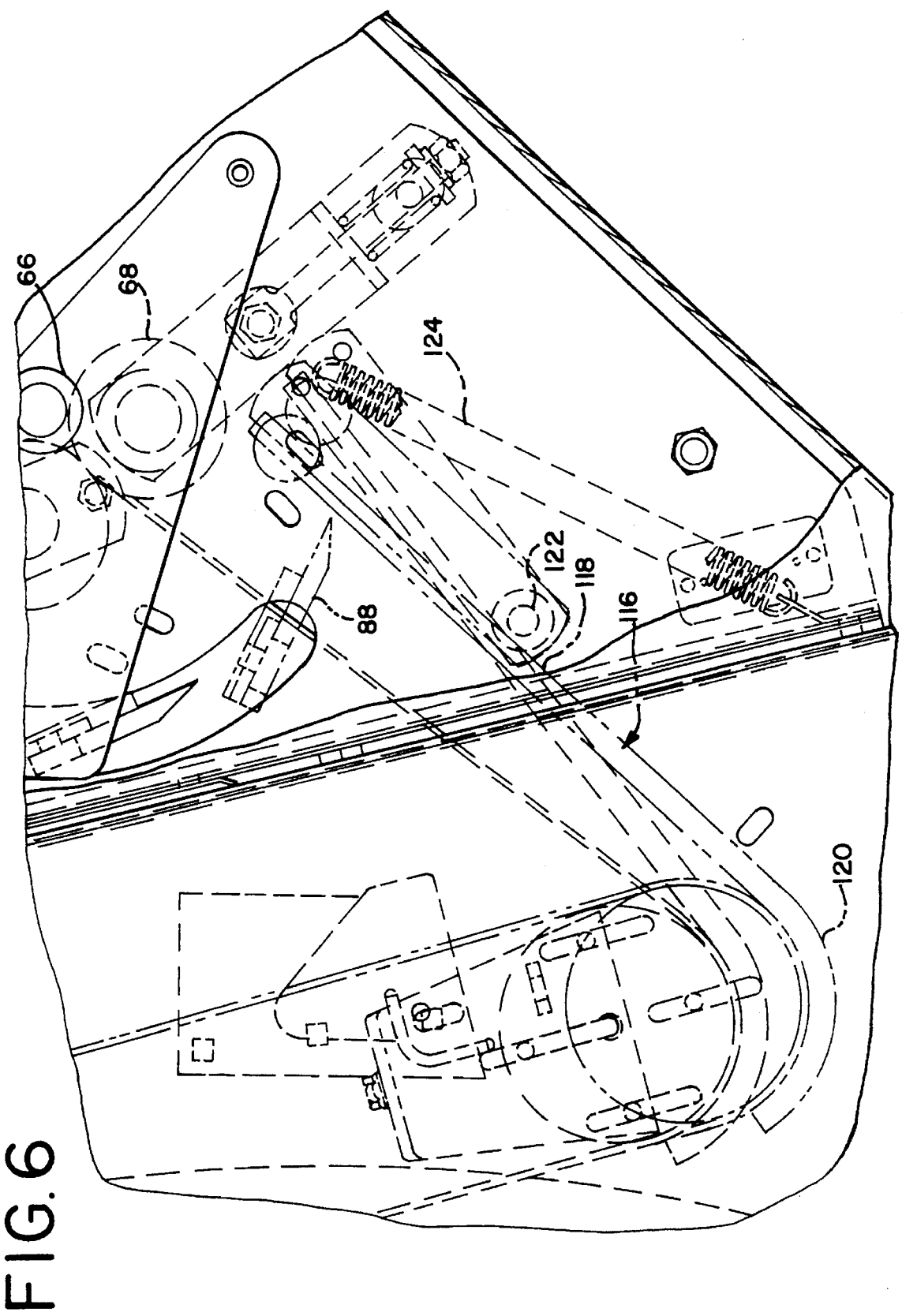
Figure 7:
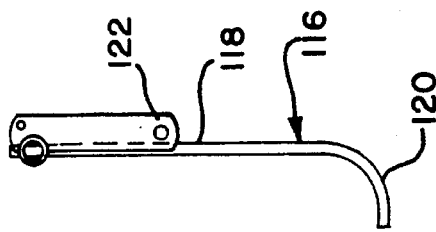
Figure 8:
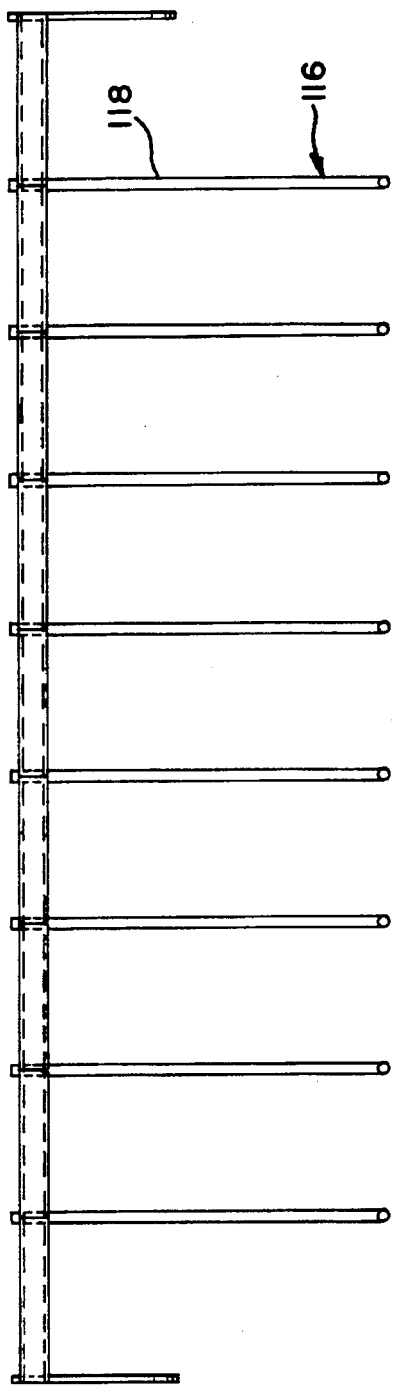
Figure 9:
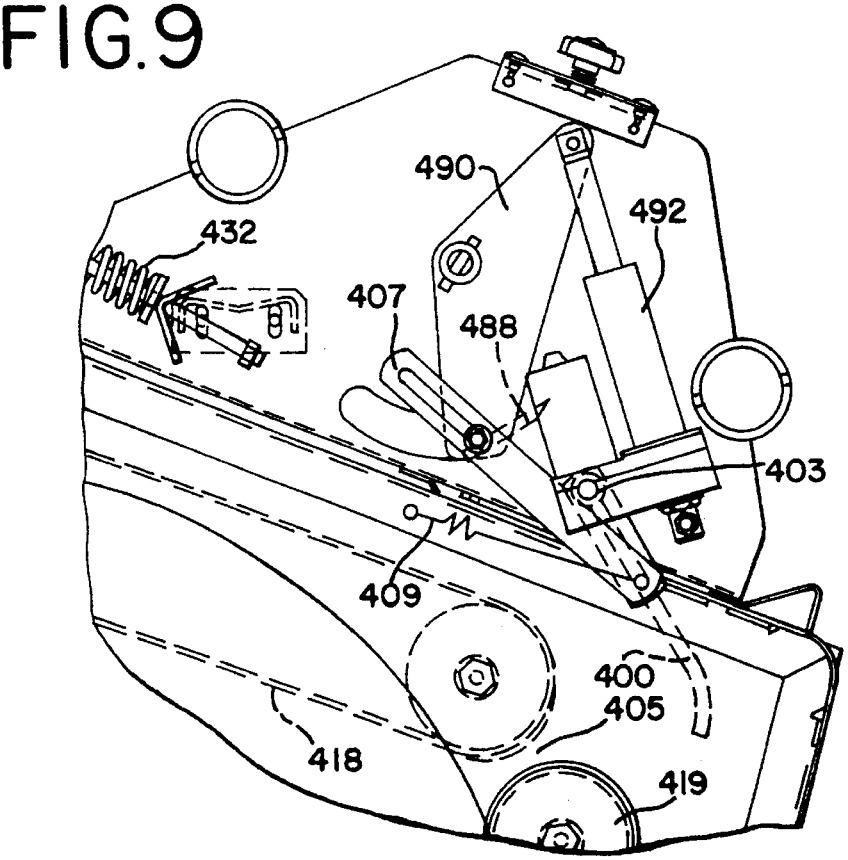
Figure 10:
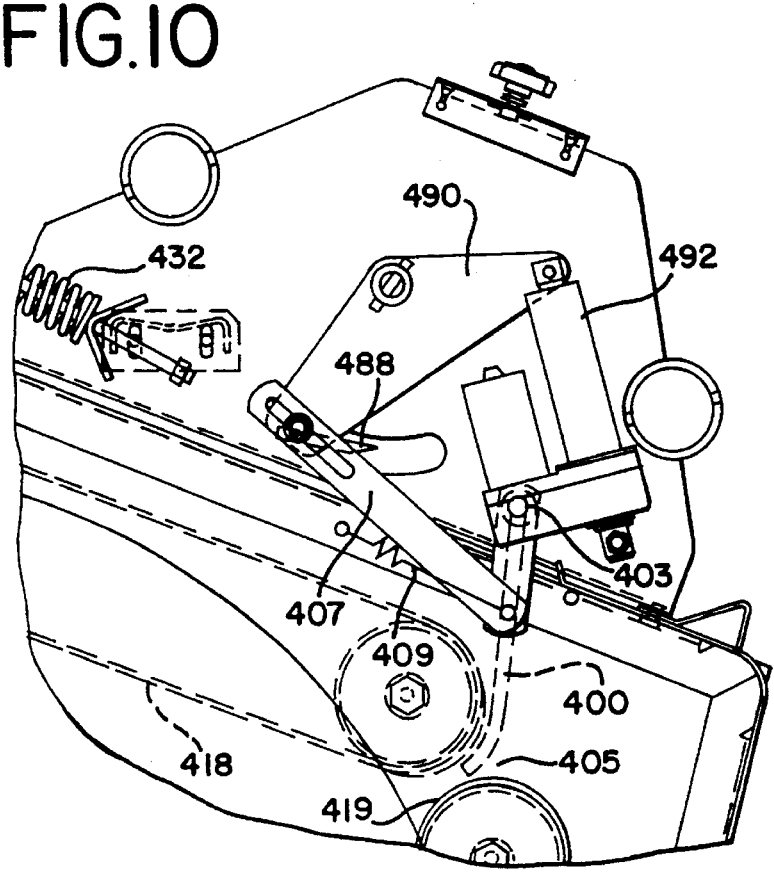

FIG. 1 is a side sectional view of a round baler having a fixed chamber and incorporating the bale wrapping apparatus made according to the present invention;

FIG. 2 is an enlarged cut away section of a portion of the round baler of FIG. 1 illustrating a preferred bale wrapping apparatus from a left side view;

FIG. 2A is a somewhat schematic left side view illustrating details of a preferred bale wrap advancement and severance assembly shown in its orientation while baling is proceeding;

FIG. 2B is a view as in FIG. 2A but in its orientation during wrapping of a bale;

FIG. 3 is an enlarged cut away section of a portion of the round baler of FIG. 1 illustrating the bale wrap apparatus from a right side view;

FIG. 3A is a somewhat schematic right side view generally corresponding to FIG. 2A;

FIG. 3B is a somewhat schematic right side view generally corresponding to FIG. 2B;

FIG. 4 is a partial elevational view of the rear of the round baler of FIG. 1;

FIG. 5 is a side partially sectioned view of an alternate embodiment of a round baler utilizing a bale wrapping apparatus made according to the present invention;

FIG. 5A is a left-side view of the FIG. 5 embodiment illustrating the wrapping mechanism in greater detail;

FIG. 5B is a right-side view generally corresponding to FIG. 5A;

FIG. 6 is an enlarged elevational view of an alternate embodiment of the bale wrap feed assembly of the present invention utilizing a plurality of tines;

FIG. 7 is a side elevational view of a portion of the bale wrapping apparatus illustrating the tines of the bale wrap feed assembly shown in FIG. 6;

FIG. 8 is a plan view of a portion of the bale wrapping apparatus illustrating the tines of the bale wrap feed assembly;

FIG. 9 is a side elevational view of an alternate embodiment having a positively actuated wrapping material feed assembly, shown in its position during bale formation and/or wrapping material cut-off; and FIG. 10 is a view generally in accordance with FIG. 9, illustrating the wrapping material feed assembly during bale wrapping.

DETAILED DESCRIPTION OF THE PREFERRED EMBODIMENT

Referring to the drawings in greater detail, a bale wrapping apparatus generally designated 10 is shown in FIG. 1 attached to a fixed chamber round baler 12. It should be understood that the bale wrapping apparatus of the present invention is intended to be utilized on a variety of round balers, especially fixed chamber round balers, and the foregoing description of a particular type of fixed chamber round baler is intended only to describe in general terms the structure and operational characteristics of fixed chamber round balers so that the present invention will be fully appreciated and is not intended to limit the application of the present invention to round balers having the specific structures described herein. For example, the net wrapping apparatus can also be applied to a variable chamber round baler.

As illustrated in FIG. 1, the fixed chamber round baler 12 of a type well known in the art includes an open throat 14 for introducing cut forage crops into the fixed substantially cylindrical round baling chamber 16. Disposed tangentially about the round chamber 16 of the round baler are a plurality of endless forming belts 18 that are positioned adjacent to one another to extend the width of the round baler. The endless belts ride on rollers 19 that are driven by a conventional chain and gear drive system disposed about the baler. Alternatively, rollers may be adjacently positioned about the chamber and utilized without belts. The chain and gear drive system is driven by a conventional power source, usually the power take off of a pulling tractor or other vehicle.

The round baler 12 includes an outer housing 20 having front 22 and rear 24 clam shell sections that cooperate to form the housing 20. The two clam shells are preferably joined together along a generally vertical Joint 26 at a pivot axis 28 at the top of the joint 26. Typically, the volume of the front clam shell section 22 is slightly larger than that of the rear clam shell section 24. A hydraulic actuator 27 is provided that pivots the rear clam shell section 24 about the pivot axis 28 opening the housing and the chamber to allow a formed bale to be removed from the baler.

The round baler 12 is generally hitched to a tractor by conventional means and pulled through a previously cut field of forage crop. As the round baler is pulled through the cut forage crop, a pick up mechanism 29 of a type well known in the art feeds the crop through the open throat 14 and into the fixed chamber. Bottom belts 39 move the crop rearwardly, while the remaining belts 18 lift and tumble the material to the center of the baling chamber. Additional material fed into the chamber builds around the loose material until the chamber is filled. As more material enters, the bale builds and is compacted particularly along its outer shell. The resulting bale has a hard or compacted outer shell and a center that breaths. The rear clam shell section of the housing rotates about the pivot axis 28 allowing the compacted bale 25 to exit from the fixed chamber baler.

When the bale wrapping apparatus is employed, the ejected bale 25 will be tightly wrapped. It will be appreciated that, if the rotating baler rollers and belts were to engage such a wrapped bale 25, it is most probable that the baler rollers and/or belts would damage the material wrapped around the bale, particularly when the wrapped material is netting which is susceptible to being severed, particularly when it is under tension. Accordingly, it is advantageous to include a stationary spacer bar or rod 21, typically mounted between spaced side frame members 23. In the event a previously ejected wrapped bale were to roll toward the baler 12, the bale would simply engage the spacer rod 21 to prevent any contact between the bale and the baler rollers or belts.

The bale wrapping apparatus 10 of the present invention which is shown in FIG. 1 is disposed primarily within a compartment 30 of the rear clam shell section 24 of the baler 12. The wrapping apparatus also can be positioned on the top or at the front of the baler.

Compartment 30 includes a cover or shield 31 which is disposed over a portion of the rear clam shell section 24 of the round baler housing and is hingedly connected to the rear clam shell section 24 about an axis 34 near the top edge of the compartment 30. An actuator, preferably a compression spring 32, which is positioned in a compressed state when the shield 31 is closed, is connected to a triangular crank arm 35 to assist in opening the shield 31 about its center of rotation 34 when access to the bale wrapping apparatus is desired. Rotation of the shield 31 permits access to the bale wrapping apparatus 10 to permit the user to insert a supply of net wrap or the like into the bale wrapping apparatus.

The preferred bale wrap or net wrap utilized in the present invention is of a type well known in the art and is preferably provided in the form of a cylindrical roll 44 of net wrap 42, which is typically wound around a central core. It is preferred that the central core extend beyond the width of net wrapping on either end of the roll 44.

Vertically disposed sidewalls or support plates 48 at either side of the compartment 30 hold a generally cylindrically shaped mount or support sleeve 50. A generally cup shaped end cap 51 is inserted through the support sleeve at either end and engages a portion of the inner diameter of the central core. Each end cap 51 supports the wrapping roll 44 and allows it to rotate. End caps 51 preferably include axially extending diametrically opposed slots 53 adapted to receive an elongated member such as a bolt extending through the support sleeve, so that the end cap may be locked in place.

A pair of horizontally disposed roll support plates 52 are connected to the vertically disposed support plates 48 on either end of the compartment 30 to temporarily hold a full wrapping roll 44 at a height slightly lower than its operating height and such that the central axis of the roll 44 is slightly below the center of each end cap 51. The support plates 52 hold the roll while the operator inserts the end caps 51 through the sleeves 50 and into the central core to permanently support the wrapping roll along a centerline which does not shift as the roll is depleted. It is preferred that the surface 55 of each horizontally disposed support plate 52 slopes toward its center to prevent the wrapping roll from rolling off during installation. It should be understood that the support plates 52 do not engage the wrapping roll during operation. The operator is required to slightly lift the ends of the roll off the support plates 52 in order to insert the end caps 51 into the central core. In addition, the plates have vertical slots in the downwardly extending flange portion 52a of the plates 52 adapted to receive an assembly component, such as the illustrated bolt and associated nut, for adjusting and securing the support plates 52 at the desired height for the particular type of rolls being used.

The bale wrapping apparatus 10 is also provided with a net tensioning linkage system 36 (FIGS. 2 and 3) including the previously described triangular crank arm 35 as well as link arm 38 and a tension spring 40 connected between the triangular crank arm 35 and the straight link arm 38. A similar arrangement is disposed on either side of the compartment 30. A contact bar 54 held by the link arm 38 extends across the width of the compartment and is biased by the cooperation between the spring, the crank arm and the link arm against a portion of the wrapping roll 44 wound around the central core. The roll tensioning linkage system 36 is illustrated in FIGS. 2 and 3 with the contact bar 54 disposed so as to contact the wrapping roll even when the size of the roll is at its minimum. The bar is capable of contacting any size of wrapping roll that will fit within the compartment in order to brake or tension the wrapping roll and prevent unwanted unwinding and slack, which is particularly undesirable when netting material is being used. The bar 54 is rigidly affixed at either end to link arms 38. Braking of the wrapping roll is provided to tightly wrap the netting material or the like onto the bale and hold the bale compression. The amount of tension provided may be adjusted by manipulating a spring tension adjustment set 56 disposed coaxially with the spring 40.

Disposed adjacent the wrapping roll 44 is a feed sensor 58 having a disc shaped roller 60 and a support arm 62. The roller 60 is supported by the arm 62 and engages the outer diameter of the wrapping roll and rotates about a generally horizontal axis. The support arm 62 is connected to the support plate 48 and is also rotatable about a generally horizontal axis. The horizontal axis for the support arm 62 is positioned vertically below the horizontal axis of rotation for the roller 60 when the diameter of the wrapping roll is at a maximum so that, as the diameter of the wrapping roll is reduced during deployment of the wrapping material, the roller 60 assisted by gravity continues to engage the outer diameter of the wrapping roll moving generally downwardly. Roller 60 preferably is biased against the wrapping roll using a spring or other tensioning mechanism 63.

Feed sensor 58 utilizes a conventional magnetic reed switch 61 to signal the operator of movement or rotation, and hence feeding of the wrapping roll. The feed sensor signals the operator, preferably via an indicator such as a flashing light mounted in the tractor, that the wrapping material roll is moving. The magnetic reed switch generates a signal when magnet 65 rotates past the switch 61, which signal is passed to a control panel to signal the operator that the wrapping material roll is moving. In the event that the roller 60 should come to rest at a position where it causes the feed sensor to signal continuously, typically when the magnet and reed switch are aligned with each other, the feed sensor circuitry is equipped with an automatic shut off that stops the signal to the operator after a predetermined amount of time has elapsed. The feed sensor moves upwardly about the support arm axis out of its operating position and preferably automatically remains there to facilitate insertion of a new roll of wrapping when the shield 31 is raised.

Wrap material 42 from the wrapping roll 44 can be directed downwardly from the wrapping roll around a stationary back wrap bar 64. From the stationary back wrap bar 64 the wrapping travels along a path to a net feed drive roll 66, which is preferably rubber coated, adjacent a spring loaded roll 68, preferably an uncoated metal roll, and passes between the wrap drive roll 66 and the roll 68 as each rotates. Stationary back wrap bar 64, when utilized, increases the wrap material engagement on net feed roll 66 in order to insure positive control of the wrap material between rolls 66 and 68. Rolls 66 and 68 cooperate to form a pinch point which feeds the wrap material 42 to the baling area. The roll 68 is biased against the wrap drive roll preferably by a spring 70 disposed between the support plates 48 and the roll 68. Roll 68 may be coated with a durable material, such as a rubber. The wrap material 42 may be manually threaded around the drive roll 66 and between the drive roll and the roll 68 when initially threading a wrapping roll 44.

Wrap drive roll 66 is rotated by a driven sheave 72 connected by a belt 67 (typically of rubber and Kevlar or the like) to a baler roller sheave 74. The baler roller sheave 74 is driven off of the chain and gear system which rotates the endless bale forming belts in the round baler chamber. It should be understood that the baler roller drive sheave 74 is continuously rotating while the driven sheave 72 connected to the drive roll 66 rotates only when it is necessary to feed wrapping material into the bale chamber.

Referring now to FIG. 3, a tension idler 76 is for receiving a V-belt or the like disposed on a portion of a carriage 78 that has a center of rotation 80. The center of rotation 80 of the carriage 78 is a torsion rod 82 that extends across the width of the compartment 30. The tension idler 76 is moved in an arc when the carriage is rotated by the torsion rod and is adapted to engage the belt 67 between the baler roller sheave 74 and the driven sheave 72 to tension the V-belt or the like into engagement with both the baler roller sheave 74 and the driven sheave 72 thereby driving the driven sheave 72 which in turn rotates the drive roll 66 pulling the wrap material 42 through the pinch point between the roll 68 and the drive roll 66 and down toward the baling chamber. It should be noted that the belt idler is illustrated in both its belt engaging position 76 and its non-engaging position 76a (in phantom) in FIG. 3.

The belt idler 76 is rotatable about an axis that extends through a slot 69 in the carriage 78. The axis may be positioned in any portion of the slot thereby allowing the tension supplied by the idler when engaging the belt 67 to be adjusted to supply an appropriate tension on the belt 67. It should be understood that the belt 67 is loose enough on the baler roller sheave 74 when not engaged by the belt idler 76 such that the belt 67 does not move even though the baler roller sheave 74 is constantly rotating during operation of the baler. On occasion, however, the baler roller sheave 74 may engage the belt even when the idler is not tensioning the belt, thereby urging the driven belt to move slightly. This could possibly cause the driven sheave 72 to rotate the drive roll 66 thereby feeding wrapping material when it is not desired. A brake 84 prevents this undesirable result. This wrap feed roll brake also plays a part in the wrap cut-off operation. Wrap feed roll brake 84 stops the wrap feed rolls as the rotating bale continues to pull in the wrap, which results in an increase in wrap tension in order to facilitate wrap cut-off.

The brake 84, including a brake pad 86, preferably made of rubber or the like, is also disposed on the carriage 78 adjacent the driven sheave 72. The brake 84 and associated brake pad 86 are movable along an arc between positions of engagement and non-engagement with the driven sheave 72, both positions being shown in FIG. 3. The brake pad is designated 86a (shown in phantom) when in its engagement position. Brake pad is designated 86 when in its non-engagement position. In the illustrated embodiment, movement between the positions of engagement and non-engagement is accomplished by rotation of the carriage by torsion rod 82. The brake also includes a pair of slots adapted to receive a pair of bolts or the like so that the position of the brake on the carriage 78 may be adjusted to place an appropriate stopping and breaking force on the driven sheave 72.

A knife blade 88 is also disposed on the carriage 78 in the illustrated embodiment, and it is moved by the carriage when the carriage is rotated by the torsion rod 82. The blade is adapted to reciprocate between a non-cutting position (designated 88 in FIGS. 2B and 3B) and a cutting position (designated 88a in FIGS. 2A and 3A) to engage and sever the wrapping material being fed into the baler. The belt idler 76, the brake 84 and the blade 88 all ride on the carriage as it rotates about its center of rotation to effect feeding of the wrapping material into the baling area when disposed in one position and cutting and maintaining of the wrapping material when disposed in a second position.

When the belt idler 76 is in its parked position 76a as shown in FIGS. 3 and 3A, the brake pad 86a engages the driven sheave 72 and holds it in place to prevent the net feed roll 66 from rotating. Simultaneously, the blade 88 is disposed to its cutting position at 88a, thereby engaging and severing the wrapping material 42. When the belt tension idler 76 is moved by rotation of the torsion rod and carriage into engagement with the belt 67 to tension the belt 67 around the driven and driver sheave, the brake pad 86 rotates out of engagement with the driven sheave 72, and the knife 88 is rotated out of its cutting orientation at which it engages the wrapping material thereby allowing a continuous stream of wrapping material to be fed to the baling chamber, as shown in FIGS. 2B and 3B. In these views, a leading edge 42a of the wrapping material has been fed through the opening between adjacent rollers 19 and has made its way between the rotating completed bale 112 and baling belt 18 to initiate wrapping of the bale.

The carriage 78 is rotated by the torsion rod 82 fixedly connected to the carriage on one side of the compartment 30 and fixedly connected to a portion of a lever arm 90 on the other side of the compartment. The lever arm 90 is moved by an actuator 92, preferably an electric actuator, connected to the lever arm 90. The actuator 92 is cycled by means of a baler control from the tractor when the operator of the baler wishes to wrap a bale. The actuator is extended as shown in FIG. 2A and thereby moves the lever arm 90 and ultimately turns the carriage 78 via the torsion rod 82 between the feeding position (FIGS. 2B and 3B) and a position of cutting and holding the wrapping material (FIGS. 2A and 3A.) Thus, the actuator and carriage simultaneously rotate the belt idler 76, the brake 84 and the blade 88 between a wrapping position and a cutting position (which typically is also the position maintained during baling).

The bale wrapping apparatus of the present invention preferably is also provided with a wrapping material feed assembly. The illustrated feed assembly is a generally J-shaped feed assembly, such as the sheet-like feed assembly 100 shown in FIGS. 2 and 3, which has a substantially planar straight portion 102 and a non-planar typically curved portion 104. The straight portion 102 of this feed assembly 100 is disposed below the feed roll 66 and the roll 68 such that wrapping material pulled through the pinch point between the roll 66 and the roll 88 falls onto the substantially planar portion of the feed assembly 100. In this arrangement, the straight portion 102 is angled downwardly below horizontal into the baling area where the curved portion 104 begins curving upwardly adjacent a bale forming belt roll and belts 18 utilized in forming the bale in the chamber.

The curved portion 104 of the feed assembly is complementary to the shape of the baler roller and the belts riding on the baler roller and is disposed adjacent thereto lightly engaging the belts 18 forming a pinch point 105. The feed assembly is connected to the support plates 48 about a pivot axis 106 approximately equally distanced from either end of the feed assembly. A tension spring 108 is connected to the straight portion 102 and by a spring clip 110 to a wall on the rear clam shell section to bias the feed assembly 100 about the pivot axis 106 so that the non-planar portion 104 is in contact with the bale forming roller or associated endless belts 18 in the baler chamber.

The wrapping material 42 falling onto the feed assembly when the carriage is in its bale wrap feeding position slides toward the pinch point 105 formed between the driven baler belts 18 and the non-planar portion 104 of the feed assembly where it is pulled into the chamber and wraps around the rotating bale 112. An adjustable stop 114 is disposed adjacent the non-planar portion 104 of the feed assembly to limit movement of this portion of the feed pan away from the bale forming roller of the bale forming belts 18. This arrangement ensures that the wrapping material 42 is fed properly into and around the rotating bale and also facilitates forage recycling.

During formation of the bale, stray forage material tends to move from the interior baling chamber 16 and between the bale forming members or belts to an area outside of the belts where the forage material can become lost as it filters out of the clam shell housing. This can result in loss of valuable crop material, particularly for crops such as alfalfa in which substantial feed value is present in fine leaves which can rather easily become disconnected from the rest of the plant, which increases the likelihood of valuable crop passing out of the baling chamber between the baling belts or other baling members. Dry baling conditions contribute to this crop loss problem.

As illustrated in FIG. 1, flat bale forming belts disposed on the baler rollers move in a counter-clockwise direction while passing along the inside surface of the baling chamber. At the same time, the belts move in a clockwise direction outside of the baling chamber. Stray crop finds its way into passageway 118 outside of the baling chamber and moves in a clockwise direction until it engages the feed assembly 100 which now functions as a crop recycle assembly, particularly when assembly 100 is a J-shaped sheet-like member which provides a smooth surface along which the stray crop slides as the tension spring 108 or the like allows the stray crop to move the curved portion 104 away from the roller 19 while the assembly 100 rotates about its pivot axis. The stray crop material thereby re-enters the bale forming chamber, being directed thereinto by the curved portion 104, rather than being lost by filtering out of the baler. Adjustable stop 114 cooperates to prevent unusually large swings of the feed assembly.

Wrapping material feed assembly can also take the form of a feed assembly having a plurality of tines or rods 116 as illustrated in FIGS. 6, 7 and 8. Each rod includes a straight portion 118 and a non-straight, typically curved portion 120 and is connected to the support plates by an axis 122. The rods pivot about the axis and are biased by a spring 124 so that the curved portions of the rods engage the baler roller and belts utilized to form the bales. Wrapping material exiting the wrapping material feed rolls is directed downwardly toward the curved portion of the rods where it is pinched between the rods and the baler belts 18 and pulled into the bale chamber where it wraps around the rotating bale.

In some crop conditions, such as when the crops are wet and/or "trashy", loose clumps or portions of forage material which pass between the baling chamber belts or rollers and into the passageway 118 may require cleaning by the operator and could cause machine down time. Because a portion of the feed assembly is positioned in a passageway 118, the feed assembly can catch such loose clumps or portions of forage material. Under these types of conditions, the spacing between the rods or tines 116 allows large clumps of often low value crop material to pass between the tines 116 and fall out of the baler, rather than clog up operation of the device. This tine arrangement can actually help clean out these materials when used under these less-than-desirable baling conditions while assisting feeding of the wrapping material into the pinch point once baling has been completed.

An alternative embodiment of the bale wrapping apparatus 10a of the present invention is illustrated in FIGS. 5, 5A and 5B. The bale wrapping apparatus 10a is mounted on a round baler of a type well known in the art. The round baler is adapted to be pulled and powered by a tractor (not shown). The round baler includes a housing 220 made up of two sections, at least one of which is pivotable about an axis. The baler also includes a throat 214 for the introduction of cut forage material into the housing. Disposed about the interior of the housing are a plurality of driven belts 218 that extend around the housing and for the width of the housing. The belts 218 cooperate to tumble and form the forage material into a bale within the housing.

The bale wrapping apparatus 10a is positioned on a clam shell portion and is adapted to feed bale wrapping material into the housing for wrapping a bale. The bale wrapping apparatus 10a includes a tensioning linkage system 236 (FIGS. 5A and 5B) for tensioning wrapping material carried on a roll 244 to tension the wrapping material as it is applied to the baler to hold the wrapping material tightly on the bale in order to main the bale compression when the wrapped bale is ejected from the baler. A position is provided for storing a spare roll 244a of wrapping material.

A feed sensor 258 is provided to signal the operator that the wrapping material is being fed. In addition, a pair of wrapping material feed rolls 266 and 268 cooperate to pull wrapping material from the roll 244 to advance the wrapping material 242 toward the feed apparatus. As in the preferred embodiment, a belt tension idler 278, a wrapping brake and brake pad 286 and a knife 288 move generally simultaneously, preferably being carried on a carriage 278 and rotated between a wrap feeding position and a wrap cut-off position. The belt idler, the brake and the knife are simultaneously moved through an arc when the carriage is rotated.

The bale wrapping apparatus 10a preferably is also provided with a feed assembly 300 that directs the wrapping material toward the interior of the housing for engagement to a rotating bale. The feed assembly includes a generally non-planar portion 304 disposed adjacent to and complementary in shape to the bale roll and belts 218. The non-planar or curved portion lightly engages the bale forming belts forming a pinch point 305. Thus, wrapping material fed to the feed assembly is directed to the pinch point and pulled into the baling chamber for wrapping a rotating bale. Feed assembly 300 can also function to recycle crop and/or permit passage of crop therethrough under certain crop conditions as generally discussed elsewhere herein in connection with other embodiments.

As previously discussed, each wrapping material feed assembly 100, 116 and 300 illustrated herein can be mounted in a biased manner such as by a spring 124 (FIG. 6) to permit movement of the feed assembly away from the pinch point and to permit crop material to pass thereby. When desired this movement of the wrapping material feed assembly can be positively effected as generally shown in FIGS. 9 and 10. A feed assembly 400 is shown for movement to and away from pinch point 405 between rollers 419 for mounting and rotating baler belts 418. Feed assembly 400 is pivotally mounted at 403. Lever arm 490 is moved by operation of actuator 492 to, among other things, move blade 488 into and out of its cutting orientation. A linkage arm 407 joins feed assembly 400 to the lever arm 490, preferably under the bias of a spring 409 or the like. When actuator 492 positions the lever arm 490 in its cut-off and bale forming position (FIG. 9), the linkage arm 407 moves the feed assembly 400 well away from the pinch point 405. This facilitates trash dumping when necessary. When wrapping material is to be deployed to wrap a bale, the actuator 492 retracts, resulting in movement of the free end of the feed assembly 400 moving into the pinch point 405.

The present invention is also provided with a control mechanism that assists the operator in carrying out desired functions. The control panel, generally shown at 94, is preferably mounted on the tractor (not shown) so that the operator need not leave the tractor seat to operate the bale wrapping apparatus of the present invention. Details of circuitry and wiring between the control panel 94 and the rest of the baler are generally omitted for simplicity. Also, it will be understood that microprocessor or processor components are located in a general manner in association with the control panel 94.

The control mechanism may be utilized in conjunction with a suitable sensing mechanism such as those generally known in the art to detect a full bale so that bale wrapping is not performed unless a full bale has been made. This may be overridden by the operator when so desired; for example, there may not be enough forage material in a field to make a full bale, yet it is still desirable tow rap it. A control switch 96 also allows the operator to switch between utilizing the bale wrapping apparatus of the present invention and a conventional twine wrapping apparatus of a type normally disposed in the upper front section of many round balers.

The control mechanism is also utilized to signal and activate the actuator 92 to move the carriage 78 into a wrapping material feeding position so that the wrapping material 42 may be introduced into the chamber 16 once bale formation has been completed and the full bale signal has been given. In the preferred embodiment, until that signal has been given, actuator 92 maintains the lever arm 90 in engagement with a switch 93 in the position illustrated in FIG. 2A. Rotation to the FIG. 2B position releases switch 93 to indicate wrapping material feeding can begin. When switch 93 and lever arm 90 are not in engagement, this indicates the unit is in or is moving to its bale wrapping cycle, and therefore only wrapping functions are to be in operation.

A feedback loop may be utilized in association with the microprocessor to provide consistent net or twine placement on the bale independent of the tractor power take-off speed by relaying the net or twine quantity fed to the control mechanism. More specifically, the extent of wrapping material deployment can be controlled by a time function. In other words, the longer the time during which the wrapping material is fed, the more material will be wrapped around the bale, provided the bale rotates at a consistent speed. However, bale rotation speed can vary. The provision of the feedback loop can eliminate the variation between speed and length of baling material deployed as follows. Each rotation of the magnet 65 or the like past the reed switch 61 emits a signal. Each signal is multiplied by the length of wrapping material travel which is delineated by each rotation of the roller 60 that is caused by its engagement with the wrapping material roll 44 as it unfurls.

In other words, the number of times the reed switch activates is signalled to the microprocessor which counts the number of activations and converts same to the length of feet deployed. This will provide a running length value. When the running length value reaches the deployment length selected by the operator, a signal is generated to cease bale rotation and wrapping material feed. This arrangement allows the operator to better control when the wrapping cycle is to stop and permits the operator to precisely select and modify the length of baling material to be deployed for each bale.

In operation of the preferred embodiment of the present invention, a net wrapping roll is placed on the roll support plates 52 to assist in installing the roll. Once the roll is on the supports, end caps 51 are inserted through the support sleeves and locked in place engaging the center core of the net wrapping roll to support the roll. The net wrapping preferably is fed around the back wrap bar 64 and between the feed roll 66 and the other roll 68. The carriage 78 should be in the wrapping material feeding position so that the brake 84 is released from engagement with the feed roll 66 to allow the wrapping material to be fed to its ready position. The shield 31 can then be closed and the bale wrapping control placed in the stop/cut position engaging the brake. The feed sensor automatically moves into engagement with the outer diameter of the roll of wrapping material as the shield is moved to its closed position. Contact bar 54 of the net tensioner linkage 36 also engages the roll of wrapping material to provide a constant tension on the roll regardless of the size of the roll so that an even supply of wrapping material is fed into the baler and a constant wrapping material tension and resulting bale compression are maintained. The operator may then proceed to fill the bale chamber with the cut forage crop forming a bale in the customary manner.

With a full bale chamber and formed bale, the operator initiates the wrapping apparatus from the wrap control panel 94. Alternatively, the wrap controller may automatically activate the bale wrapping apparatus when a full bale is detected by a suitable sensing mechanism. A signal is sent by the control mechanism to the actuator 92 which retracts, rotating the lever arm 90 thereby turning the torsion rod 82. The torsion rod 82 in turn rotates the carriage 78 with the idler 76, the brake 84 and the blade 88. The carriage 78 is rotated to a wrapping position wherein the brake pad 86 of the brake 84 is rotated out of engagement with the driven sheave 72 of the feed roll 66. Simultaneously, the blade 88 is rotated out of engagement with the path of the wrapping material, and the idler is rotated into engagement with the belt 67. Once the idler engages the belt, the belt rotates about the constantly rotating bale roller sheave 74 and the driven sheave 72.

Driven sheave 72 is rotatably connected to the feed roll 66, turning this roll and the cooperating spring biased roll thereby pulling wrapping material from the wrapping material roll and feeding the leading end of the wrapping material onto the downwardly angled straight portion 102 of the feed assembly. The net wrapping material, due in part to the downward slope of the feed assembly, slides toward the curved portion of the feed assembly. The curved portion of the feed assembly is lightly engaged with bale forming belt(s) at a point adjacent a bale forming roller thereby forming the pinch point 105. As the leading end of the wrapping material reaches the pinch point, the bale forming belts pull the wrapping material into the baling chamber and into engagement with the rotating bale. The wrapping material is quickly wrapped around the bale for the number of times which has been selected by the operator, typically between about one and three-quarter and about two and one-half wraps.

When the desired length of wrapping material is deployed, sensed by the wrapping material feed sensor, recorded and processed by the controller or microprocessor, the control mechanism powers the actuator 92 which extends, rotating the lever arm 90 back to its original position. The rotation of the lever arm 90 and the associated torsion bar 82 rotate the carriage 78 to the cut off/stop position. Rotation of the carriage 78 rotates the idler tensioner 76 out of engagement with belt 67 thereby stopping the rotation of the cylinder and the feeding of the wrapping material. Simultaneously, the brake pad is rotated into engagement with the driven sheave 72 thereby stopping the rotation of the feed roll 66. At the same time, the blade 88 is rotated into engagement with a portion of the net wrapping 42 disposed between the cylinder and the pinch point 105, severing the supply of wrapping material 42 to the bale chamber. It should be understood that once severed, the wrapping material 42 between the blade 88 and the bale chamber is continued to be fed into the bale chamber and wrapped about the bale by the endless bale forming belts. The wrapped bale may then be ejected from the baling chamber and the process repeated until a new supply of wrapping material is required.

It will thus be seen that the present invention provides a new and useful bale wrapping apparatus for a round baler and has a number of advantages and characteristics including those pointed out herein and others which are inherent in the invention. Preferred embodiments of the invention have been described by way of example, and it is anticipated that modifications may be made to the described form without departing from the spirit of the invention or the scope of the claims.

We claim:

1. A baler for baling forage crop into a round bale comprising:

a housing generally defining a baling chamber and having an outer sidewall assembly including sidewalls and a peripheral wall member generally connecting the sidewalls together;

a forage crop intake assembly for introducing forage crop into said baling chamber;

said outer wall assembly including a plurality of rollers generally parallel to each other;

a bale wrap receiving opening positioned between at least one pair of said rollers and through which bale wrap passes to feed said bale wrap into said baling chamber of said baler;

a bale wrap support assembly for holding a supply of bale wrap;

a bale wrap advancement and severance assembly which receives bale wrap from said supply of bale wrap, advances said bale wrap toward said bale wrap receiving opening, and severs a portion of said bale wrap from said bale wrap supply, said advancement and severance assembly including a bale wrap cut-off member;

an actuator adapted to move said advancement and severance assembly between a bale wrap advancing position for advancing bale wrap toward said bale wrap receiving opening and a bale wrap cutting position wherein said bale wrap is severed by said cut-off member after a portion of the bale wrap has been advanced through said bale wrap receiving opening and into engagement with a bale within said baling chamber;

a bale wrap feed sensor for determining the quantity of said bale wrap deployed for wrapping the bale, said bale wrap feed sensor includes a member which detects movement of the supply of bale wrap, said member being associated with a signalling device which provides a signal to detect bale wrap movement through a given distance, said signalling device providing said signal to a processor which transforms same into a total length of bale wrap deployed, and said processor thereby determines the length of bale wrap deployed by ceasing bale wrapping when said total length generally equals a preselected length; and a bale wrap feed member positioned between said bale wrap receiving opening and said bale wrap advancement and severance assembly, whereby activation of said bale wrap advancement and severance assembly effects movement of said feed member toward said bale wrap receiving opening when said bale wrap advancement and severance assembly advances said bale wrap toward said bale receiving opening and effects movement of said feed member away from said bale wrap receiving opening during baling.

2. A bale wrapping apparatus for use on a round baler having a baling chamber and at least one pair of baling chamber rollers defining an opening therebetween, said bale wrapping apparatus comprising:

a bale wrap advancement and severance assembly which receives bale wrap from a bale wrap roll supported outside of said baling chamber and advances a free end of the bale wrap from the bale wrap roll toward said opening between the rollers and severs a portion including the free end of said bale wrap from said bale wrap roll, said advancement and severance assembly including a bale wrap cut-off member;

an actuator adapted to move said advancement and severance assembly between a bale wrap advancing position for advancing the free end of the bale wrap toward said opening between the rollers and a bale wrap cutting position wherein said bale wrap is severed by said cut-off member after said free end of the bale wrap has been advanced through said opening between the rollers;

a bale wrap feed sensor for determining the quantity of said bale wrap deployed for wrapping the bale, said bale wrap feed sensor includes a member which detects movement of the supply of bale wrap, said member being associated with a signalling device which provides a signal to detect bale wrap movement through a given distance, said signalling device providing said signal to a processor which transforms same into a total length of bale wrap deployed, and said processor thereby determines the length of bale wrap deployed by ceasing bale wrapping when said total length generally equals a preselected length; and a bale wrap feed member positioned between said bale wrap receiving opening and said bale wrap advancement and severance assembly, whereby activation of said bale wrap advancement and severance assembly effects movement of said feed member toward said bale wrap receiving opening when said bale wrap advancement and severance assembly advances said bale wrap toward said bale receiving opening and effects movement of said feed member away from said bale wrap receiving opening during baling.

3. A method of forming a bale in a round baler and wrapping the bale thus formed with bale wrap material while the bale rotates within the round baler, the method comprising the steps of:

providing a round baler with a bale wrap advancement and severance assembly having a bale wrap cut-off member, the cut-off member having a cutting orientation and a pre-cutting orientation;

introducing cut forage material into a baling chamber of the round baler and forming the cut forage material into a generally round bale;

providing a supply of bale wrap material having a free end, the supply of bale wrap material being external of the baling chamber;

advancing the free end of said supply of bale wrap material toward a bale wrap receiving opening of said baling chamber;

said advancing step effecting movement of a feed member toward the bale wrap receiving opening in order to guide the bale wrap material through the bale wrap receiving opening;

engaging the free end of said supply of bale wrap material with said bale and rotating said bale to provide a wrapped bale;

detecting and feeding back to a controller the quantity of bale wrap material deployed during said bale wrap advancing step until a preselected quantity is deployed;

moving the cut-off member from its pre-cutting orientation to its cutting orientation, while ceasing said advancing of said supply of bale wrap material and severing a portion of said supply of bale wrap material including the bale wrap material of the wrapped bale; and said moving step effecting further movement of the feed member, which movement is away from the bale receiving opening.

4. The baler of claim 1 further including a resiliently biased member which biases said feed member toward said bale wrap receiving opening when said bale wrap is being advanced.

5. The baler of claim 1, further including a linkage assembly which effects said movement of said feed member toward or away from said bale wrap receiving opening when said bale wrap advancement and severance assembly is activated.

6. The wrapping apparatus of claim 2 further including a resiliently biased member which biases said feed member toward said opening between the rollers when said bale wrap is being advanced.

7. The wrapping apparatus of claim 2 further including a linkage assembly which effects said movement of said feed member toward or away from said bale wrap receiving opening when said bale wrap advancement and severance assembly is activated.

8. The method of claim 3 wherein said effecting movement step further includes engaging the free end of the bale wrap material with the feed member which directs the free end of the bale wrap material into the baling chamber.

9. The method of claim 3 further including detecting and signalling movement of the bale wrap material during said advancing of the free end of the bale wrap material.

10. The baler of claim 1, wherein said bale wrap feed sensor determines the quantity of bale wrap deployed irrespective of baler input speed.

11. The baler of claim 1, wherein said member which detects movement of the supply of bale wrap is a rotatable member.

12. The baler of claim 1, wherein said bale wrap feed sensor is associated with an indicator which signals that the bale wrap is being deployed.

13. The baler of claim 12, wherein said feed sensor indicator automatically shuts off after a predetermined amount of time has elapsed.

14. The baler of claim 1, further including a control apparatus for signaling said actuator to move said advancement and severance assembly between a bale wrap feeding position and a bale wrap cutting position.

15. The wrapping apparatus of claim 2, wherein said bale wrap feed sensor determines the quantity of bale wrap deployed irrespective of baler input speed.

16. The wrapping apparatus of claim 2, wherein said member which detects movement of the supply of bale wrap is a rotatable member.

17. The wrapping apparatus of claim 2, wherein said bale wrap feed sensor is associated with an indicator which signals that the bale wrap is being deployed.

18. The wrapping apparatus of claim 17, wherein said feed sensor indicator automatically shuts off after a predetermined amount of time has elapsed.

19. The wrapping apparatus of claim 2, further including a control apparatus for signaling said actuator to move said advancement and severance assembly between a bale wrap feeding position and a bale wrap cutting position.

20. A baler for baling forage crop into a round bale comprising:

a housing generally defining a baling chamber and having an outer sidewall assembly including sidewalls and a peripheral wall member generally connecting the sidewalls together;

a forage crop intake assembly for introducing forage crop into said baling chamber;

said outer wall assembly including a plurality of rollers generally parallel to each other;

a bale wrap receiving opening positioned between at least one pair of said rollers and through which bale wrap passes to feed said bale wrap into said baling chamber of said baler;

a bale wrap support assembly for holding a supply of bale wrap;

a bale wrap advancement and severance assembly which receives bale wrap from said supply of bale wrap, advances said bale wrap toward said bale wrap receiving opening, and severs a portion of said bale wrap from said bale wrap supply, said advancement and severance assembly including a bale wrap cut-off member;

an actuator adapted to move said advancement and severance assembly between a bale wrap advancing position for advancing bale wrap toward said bale wrap receiving opening and a bale wrap cutting position wherein said bale wrap is severed by said cut-off member after a portion of the bale wrap has been advanced through said bale wrap receiving opening and into engagement with a bale within said baling chamber;

a bale wrap feed sensor for determining the quantity of said bale wrap deployed for wrapping the bale, said bale wrap feed sensor includes a member which detects movement of the supply of bale wrap, said member being associated with a signalling device which provides a signal to detect bale wrap movement through a given distance, said signalling device providing said signal to a processor which transforms same into a total length of bale wrap deployed, and said processor thereby determines the length of bale wrap deployed by ceasing bale wrapping when said total length generally equals a preselected length; and an indicator associated with said bale wrap feed sensor, said indicator signals that the bale wrap is being deployed, and said feed sensor indicator automatically shuts off after a predetermined amount of time has elapsed beyond when said indicator signals that the bale wrap is being deployed.

21. The baler of claim 20, wherein said bale wrap feed sensor determines the quantity of bale wrap deployed irrespective of baler input speed.

22. The baler of claim 20, wherein said member which detects movement of the supply of bale wrap is a rotatable member.

23. The baler of claim 20, further including a control apparatus for signaling said actuator to move said advancement and severance assembly between a bale wrap feeding position and a bale wrap cutting position.

24. The baler of claim 20, further including a bale wrap feed member positioned between said bale wrap receiving opening and said bale wrap advancement and severance assembly, activation of said bale wrap advancement and severance assembly effects movement of said feed member toward said bale wrap receiving opening when said bale wrap advancement and severance assembly advances said bale wrap toward said bale receiving opening and effects movement of said feed member away from said bale wrap receiving opening during baling.

25. A bale wrapping apparatus for use on a round baler having a baling chamber and at least one pair of baling chamber rollers defining an opening therebetween, said bale wrapping apparatus comprising:

a bale wrap advancement and severance assembly which receives bale wrap from a bale wrap roll supported outside of said baling chamber and advances a free end of the bale wrap from the bale wrap roll toward said opening between the rollers and severs a portion including the free end of said bale wrap from said bale wrap roll, said advancement and severance assembly including a bale wrap cut-off member;

an actuator adapted to move said advancement and severance assembly between a bale wrap advancing position for advancing the free end of the bale wrap toward said opening between the rollers and a bale wrap cutting position wherein said bale wrap is severed by said cut-off member after said free end of the bale wrap has been advanced through said opening between the rollers;

a bale wrap feed sensor for determining the quantity of said bale wrap deployed for wrapping the bale, said bale wrap feed sensor includes a member which detects movement of the supply of bale wrap, said member being associated with a signalling device which provides a signal to detect bale wrap movement through a given distance, said signalling device providing said signal to a processor which transforms same into a total length of bale wrap deployed, and said processor thereby determines the length of bale wrap deployed by ceasing bale wrapping when said total length generally equals a preselected length; and an indicator associated with said bale wrap feed sensor, said indicator signals that the bale wrap is being deployed, and said feed sensor indicator automatically shuts off after a predetermined amount of time has elapsed beyond when said indicator signals that the bale wrap is being deployed.

26. The wrapping apparatus of claim 25, wherein said bale wrap feed sensor determines the quantity of bale wrap deployed irrespective of baler input speed.

27. The wrapping apparatus of claim 25, wherein said member which detects movement of the supply of bale wrap is a rotatable member.

28. The wrapping apparatus of claim 25, further including a control apparatus for signaling said actuator to move said advancement and severance assembly between a bale wrap feeding position and a bale wrap cutting position.

29. The wrapping apparatus of claim 25, further including a bale wrap feed member positioned between said bale wrap receiving opening and said bale wrap advancement and severance assembly, activation of said bale wrap advancement and severance assembly effects movement of said feed member toward said bale wrap receiving opening when said bale wrap advancement and severance assembly advances said bale wrap toward said bale receiving opening and effects movement of said feed member away from said bale wrap receiving opening during baling.

* * * * *

UNITED STATES PATENT AND TRADEMARK OFFICE
CERTIFICATE OF CORRECTION

PATENT NO. : 5,568,716
DATED : Oct. 29, 1996
INVENTOR(S) : Kluver et al.

It is certified that error appears in the above-indentified patent and that said Letters Patent is hereby corrected as shown below:

```
Under "References Cited  U.S. PATENT DOCUMENTS",
 "3,910,178   11/1975   Eggers et al." should read
--3,910,178   10/1975   Eggers et al.--;
 "4,563,854    1/1986   Ackerman et al. ....... 53/118" should read
--4,563,854    1/1986   Ackermann et al. ...... 53/118--;
and insert --5,289,672  3/1994  Underhill ... 53/587-- after last
U.S. patent cited.

Col. 3, line 21, "aright-side" should read --a right-side--.

Col. 4, line 9, "Joint" should read --joint--.

Col. 7, line 16, "cut-off" should read --cut off--; line 19, "cut-off"
should read --cut off--.

Col. 10, line 65, "tow rap" should read --to wrap--.
```

Signed and Sealed this

Sixth Day of May, 1997

*Attest:*

BRUCE LEHMAN

*Attesting Officer*    *Commissioner of Patents and Trademarks*